United States Patent [19]
Kataoka et al.

[11] Patent Number: 5,663,804
[45] Date of Patent: Sep. 2, 1997

[54] IMAGE PROCESSOR HAVING RECORDING PAPER CUTTING CONTROL

[75] Inventors: Naoto Kataoka, Kyoto; Takashi Nakano, Shiga, both of Japan

[73] Assignee: Murata Kikai Kabushiki Kaisha, Kyoto, Japan

[21] Appl. No.: 565,158

[22] Filed: Nov. 30, 1995

[30] Foreign Application Priority Data

Dec. 20, 1994 [JP] Japan .................... 6-315395

[51] Int. Cl.$^6$ .................... H04N 1/31; H04N 1/23; H04N 1/32; G03G 21/00; B41J 11/66
[52] U.S. Cl. .................... 358/304; 358/296; 358/468; 399/385; 400/621
[58] Field of Search .................... 358/296, 300, 358/304, 400, 401, 434, 468; 346/136; 399/386, 387, 385, 1; 400/621

[56] References Cited

U.S. PATENT DOCUMENTS

| 5,206,737 | 4/1993 | Sugiyama | 358/296 |
| 5,412,407 | 5/1995 | Okubo et al. | 346/136 X |

*Primary Examiner*—Eric Frahm
*Attorney, Agent, or Firm*—Loeb & Loeb LLP

[57] ABSTRACT

Transportation of a document (P1), transportation of a recording sheet (P2), activation of a cutter system and simultaneous transportation of the document (P1) and recording sheet (P2) are carried out by a single motor (M) in an image processor (1). A first pendulum gear mechanism (16) selectively transmits the drive force of the motor (M) to a separation roller gear (g12) and a feed roller gear (g14), to a platen roller gear (g20) or to a second pendulum gear mechanism (g17). The second pendulum gear mechanism (17) continues or stops transmission of the rotational force of the motor (M) from the first pendulum gear mechanism (16) to a cutter drive gear (g28). Second and third contact parts (40c, 40d) of a regulating plate (40) regulate movement of the first pendulum gear mechanism (16) and change the transmission destination of the rotational force of the motor (M). The position of the regulating plate (40) and the rotation direction of the motor (M) are controlled by a CPU (50).

4 Claims, 12 Drawing Sheets

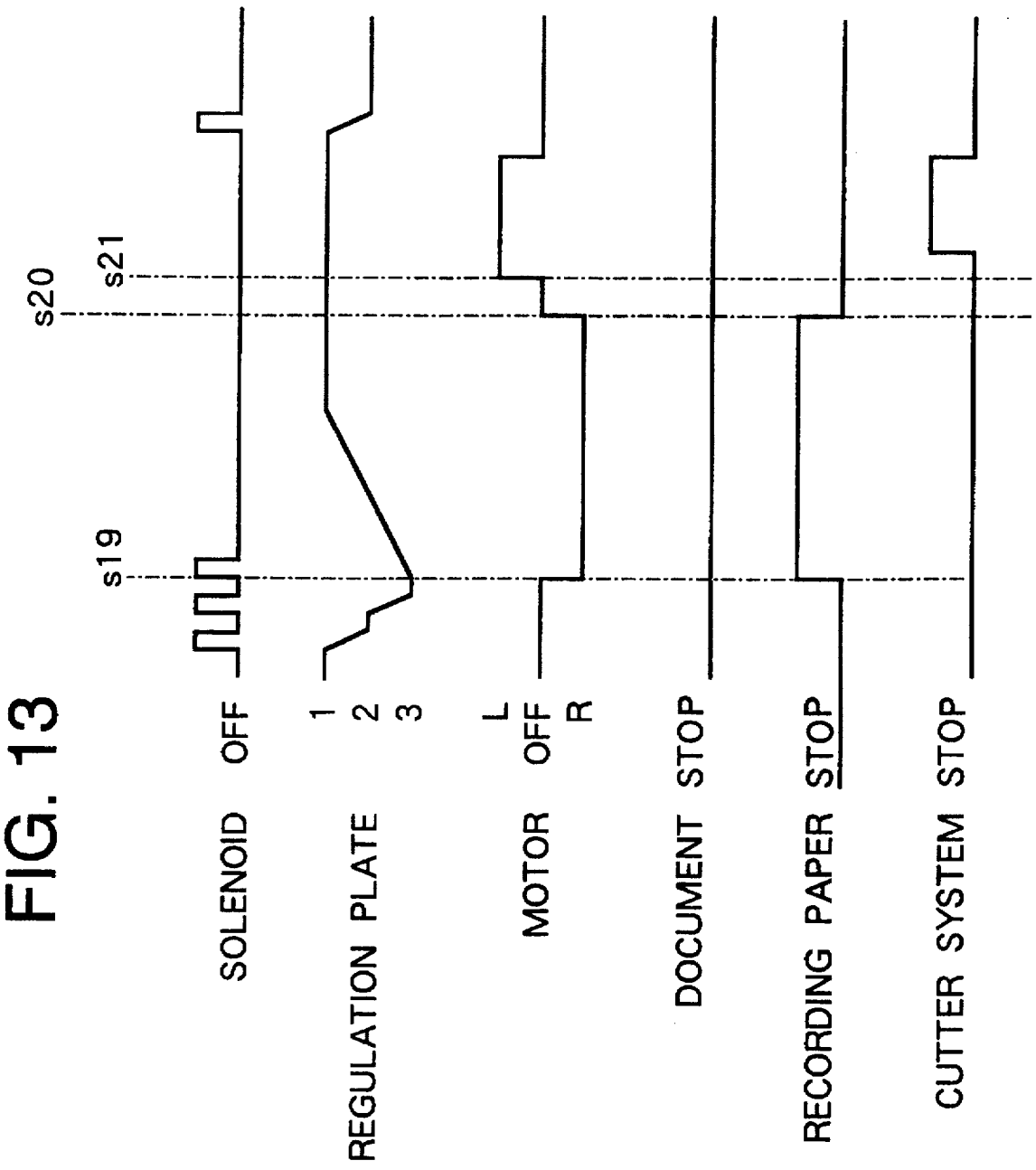

IMAGE PROCESSOR HAVING RECORDING PAPER CUTTING CONTROL

BACKGROUND OF THE INVENTION

The present invention relates to an image processor that carries out transportation of a document, transportation of a recording paper and operation of a cutter system by one motor.

Generally, image transmission, image reception and copy functions are contained in an image processor represented by a facsimile apparatus. When image reception or copying is carried out, a roll of recording paper is used in a certain type of image processors. In this case, a cutter system is arranged in the image processor to cut the recording paper which has been unrolled from the roll state and on which has finished the recording. Due to this, a system for transporting the document at times of transmission, a system for transporting the recording paper at times of reception or copying and a system for driving the cutter system exist in the image processor.

Conventionally, a drive motor is arranged for each of the aforementioned three systems, and image data transmission, image data reception, copying, and cutting of the recording paper are appropriately conducted by controlling the respective drive motors.

Another drive method for the above-mentioned three systems is known. The system for transporting the document during transmission and the system for driving the cutter system are driven by one drive motor, and the system for transporting the recording paper is driven by another drive motor. In this case, the actuation of the document transportation system or the actuation of the cutter system is selected by changing the rotation direction of the drive motor.

However, if more than one drive motor are arranged for a single image processor, manufacturing of the image processors becomes costly. Further, if a plurality of drive motors is located inside the image processor, space necessary for the drive motors alone becomes large and as a result the overall structure of the image processor becomes large.

SUMMARY OF THE INVENTION

It is an object of the present invention to reduce the number of drive means in an image processor, thereby making the image processor smaller and reducing the cost.

In order to achieve the above object, an image of the present invention includes one drive means, an exchange means for exchanging the transmission direction of the rotation of the drive means, a lock means that locks the exchange means in predetermined positions and a first control means that controls the rotation direction of the drive means and the operation of the lock means. The image processor concerned is of a type which carries out transmission of a document (i.e., image data transmission), reception of a document (i.e., image data reception) and copying of a document and cutting of a recording paper by a cutter.

The exchange means may include a first exchange gear mechanism that transmits the rotation of the drive means, which is controlled by the first control means, to either a document transport system or a recording paper transport system or to both of them, and a second exchange gear mechanism that receives the rotation from the drive means via the first exchange gear mechanism and then continues or stops the transmission of the rotation of the drive means to a cutter drive system.

The lock means may include a regulating member, a solenoid, a ratchet mechanism and a gear having a plane (or flat) cam portion. The regulating member regulates the movement of the first exchange gear mechanism. The solenoid, ratchet mechanism and cam-attached gear cooperate to move and hold the regulating member in a plurality of predetermined positions.

The image processor may further include a first detection means arranged in a transport route of the recording paper for detecting presence of the recording paper, a second detection means arranged in a transport route of the document for detecting presence of the document and a second control means that receives outputs from these detection means to control (or change) the rotation direction of the drive means and turning on/off of the solenoid of the lock means.

The control means changes the rotation direction of the drive motor and the exchange means changes the transmission direction of the rotation of the drive means. Since the lock means can lock the exchange means in various positions under control of the control means, the transmission direction of the rotation of the drive means can be determined or switched arbitrarily: there is a number of possible transmission directions. Thus, the transmission direction of the rotation of the drive means is changeable depending on a selected function of the image processor, i.e., transmitting, receiving and copying of the document or cutting of the recording paper by the cutter.

The first exchange gear mechanism transmits the rotation from the drive means, which is controlled by the first control means, to the document transport system when a document (or image data) is to be transmitted to a third party from an image processor and to the recording paper transport system when image data from outside is to be received by the image processor. When copying a document, the first exchange gear mechanism transmits the rotation from the drive means to the document transport system and the recording paper transport system. When the recording paper is to be cut, the first and second exchange gear mechanisms transmit in series the rotation from the drive means to the cutter drive system.

Movement of the regulating member in a first direction takes place upon the plane-cam-attached gear receiving the rotation from the drive means and starting rotating. (Movement of the drive means is controlled by the control means.) Movement of the regulating member in a second direction opposite the first direction occurs upon engagement/disengagement of the ratchet mechanism caused by the solenoid under control of the control means. By engaging/disengaging the ratchet mechanism, it is possible to maintain the regulating member at different levels or change the position of the regulating member stepwise, and the regulating member therefore can regulate the movement of the first exchange gear mechanism at one of these different levels. After being held at the different stepwise levels as described above, the regulating member returns to a position it had before moved by the engaging/disengaging of the ratchet mechanism. This returning occurs when the plane-cam-attached gear receives the rotation from the drive means.

When the control means receives a signal indicative of presence of document or recording paper from the detection means, it controls the rotation direction of the drive means and the activation/deactivation of the solenoid of the lock means. Accordingly, exchange of the transmission direction of the rotation of the drive means by the exchange means is possible.

As appreciated from the above, the present invention enables the exchange means to exchange the transmission direction of the rotation of the drive means in more than one direction by the control of the operations of the lock means and the rotational direction of the drive means by the control means based on signals from the detection means arranged in the transport route of the recording paper and the transport route of the document. Further, the present invention enables the single drive means to provide the document transport, the recording paper transport (the document transport and the recording paper transport may be done independently or simultaneously) and cutting of the recording paper by the cutter due to the exchange capability of the multiple rotation transmission directions of the drive means. Therefore, it is possible to reduce the number of drive means in the image processor, to make the image processor smaller and to reduce the

BRIEF DESCRIPTION OF THE ACCOMPANYING DRAWINGS

FIG. 13 is a time chart illustrating operations of the elements of the image processor when the initial cutting is performed.

DETAILED DESCRIPTION OF THE PREFERRED EMBODIMENTS

Now, a preferred embodiment of the present invention will be described with reference to the accompanying drawings.

Figure 1:
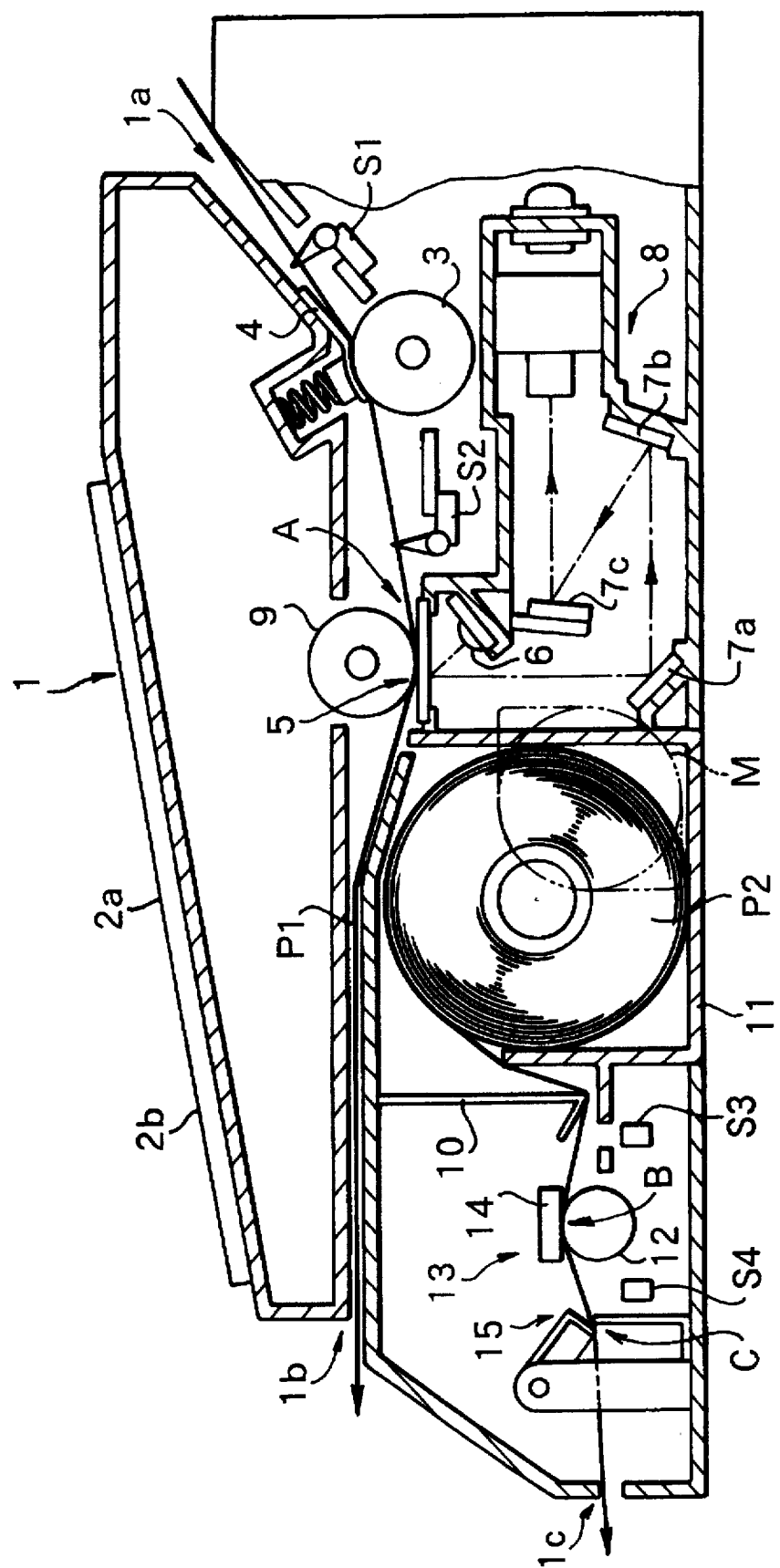
FIG. 1 is a sectional view showing a structure of an embodiment of an image processor according to the present invention.

Referring to FIG. 1, illustrated is a schematic structure of an image processor 1 according to this invention in cross section. A key input part 2a for instructing the image processor 1 to execute transmitting, receiving and copying operations and a display 2b for displaying the operational status of the image processor 1 are arranged on the upper surface of a main body of the image processor 1. When transmission of a document P1 (i.e., transmission of image data on a sheet P1 to a third party) is to be executed, the document P1 is inserted from a document feed opening 1a and the leading edge of the document P1 is held by a separation roller 3 and a separation pad 4.

In this state, upon rotation of the separation roller 3, the document P1 is transported to a reading device such as a scanner 5. If a plurality of documents P1 is inserted into the document feed opening 1a, one sheet P1 at a time is transported to the scanner 5 starting from the lowest page due to actions of the separation roller 3 and separation pad 4. A first document detection sensor S1 positioned upstream of the roller 3 detects whether a document P1 has been inserted from the document feed opening 1a. A second document detection sensor S2 located upstream of the scanner 5 detects whether the document P1 is in front of the scanner 5.

In a scanning operation, the surface of the document P1 is illuminated by a light from a light source 6, and the light reflected from the document P1 surface is further reflected by mirrors 7a, 7b and 7c, directed to a photoelectric conversion device 8 and converted to an electric signal. A feed roller 9 is provided on the scanner unit 5 for transporting the document P1 in a downstream direction from the scanner 5 such that the document P1 is eventually ejected out of the main body of the image processor 1 from a document discharge opening 1b.

When recording is to be conducted on a recording paper P2, which is a paper roll stored in a storage case 11, the paper P2 is transported (or unrolled) to a recording unit 13 along a recording paper guide 10 upon rotation of a platen roller 12. The recording unit 13 includes a thermal head 14 positioned opposite the platen roller 12. A first recording paper detection sensor S3 for detection of the presence or absence of the recording paper P2 is arranged upstream of the recording device 13 and a second recording paper detection sensor S4 for detection of whether the recording paper P2 has been correctly transported after recording has started and for checking whether the recording paper P2 has been cut after the recording paper cutting operation has been initiated is arranged downstream of the recording device 13. The roll of recording paper P2 stored in the storage case 11 is thermal recording paper.

Desired recording is carried out on the recording paper P2 using the thermal head 14. The recording paper P2 of after a specified recording has been completed is further transported by the platen roller 12 and is cut by a cutter system 15 located downstream of the recording unit 13. Then, the recording paper P2 of after the recording is ejected from a recording paper discharge opening 1c to outside of the main body of the image processor 1. If the document P1 is to be copied onto the recording paper P2, transport and scanning of the document P1 as described above, transport and recording of the recording paper P2 as described above and cutting by the cutter system 15 as described above are carried out.

Figure 2:
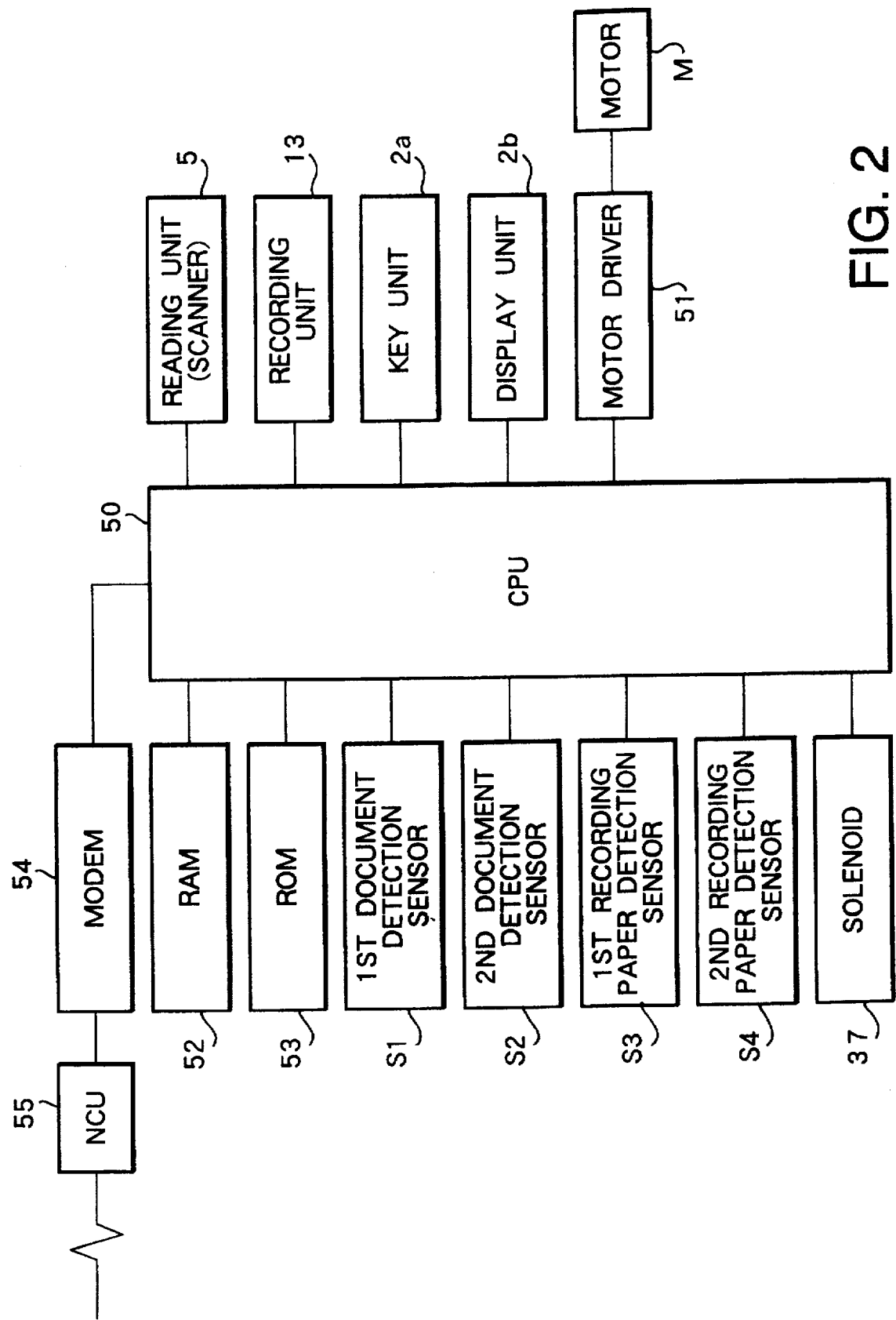
FIG. 2 is a block diagram of a circuitry in the image processor shown in FIG. 1.

FIG. 2 is a block diagram showing the circuit structure of the image processor 1. A CPU 50 is provided for controlling operations of various elements in the image processor 1. The CPU 50 is connected to the scanner 5, the recording device 13, the key input unit 2a and the display unit 2b. The CPU 50 is also connected to a motor driver 51 and the motor driver 51 is connected to a motor M. This motor driver 51 drives the motor M based on a signal sent from the CPU 50.

A RAM 52 is provided for temporarily storing the image data and a ROM 53 is for storing programs for controlling the operations of the various elements of the image processor 1. The RAM 52 and ROM 53 are both connected with the CPU 50. Furthermore, the first document detector. S1, the second document detector S2, the first recording paper detector S3, the second recording paper detector S4 and a solenoid 37 (will be described later) are all connected with the CPU 50.

A modem 54, which is also connected with the CPU 50, modulates and demodulates the image data that will be transmitted to outside and that has been received from outside. Connected with the modem 54 is an NCU 55 for carrying out transmission of dial pulses corresponding to a third party's facsimile number and for detection of receipt of dial pulses from a third party. The NCU 55 is coupled with a telephone line.

Figure 3:
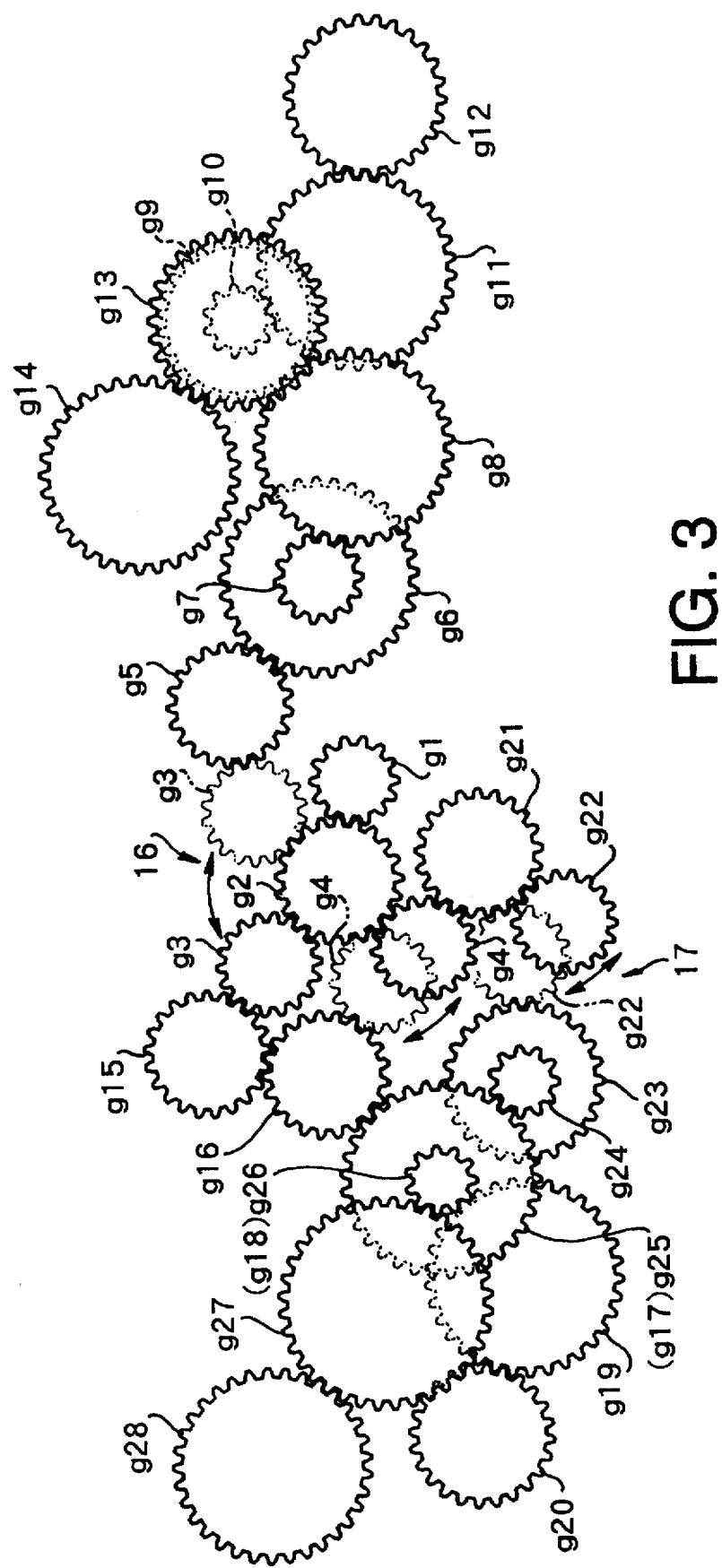
FIG. 3 illustrates relationships between gears arranged in the image processor of FIG. 1.

FIG. 3 is a diagram showing the gears for carrying out transportation of a document or recording paper and for driving of the cutter system of the image processor shown in FIG. 1. A motor gear g1 is mounted on a rotating shaft of the motor M. A first sun gear g2 engages with the motor gear g1, and first and second planet gears g3 and g4 engage with the first sun gear g2 respectively. A second sun gear g21 is arranged below the first sun gear g2. A third planet gear g22 engages with the second sun gear g21.

Figure 4:
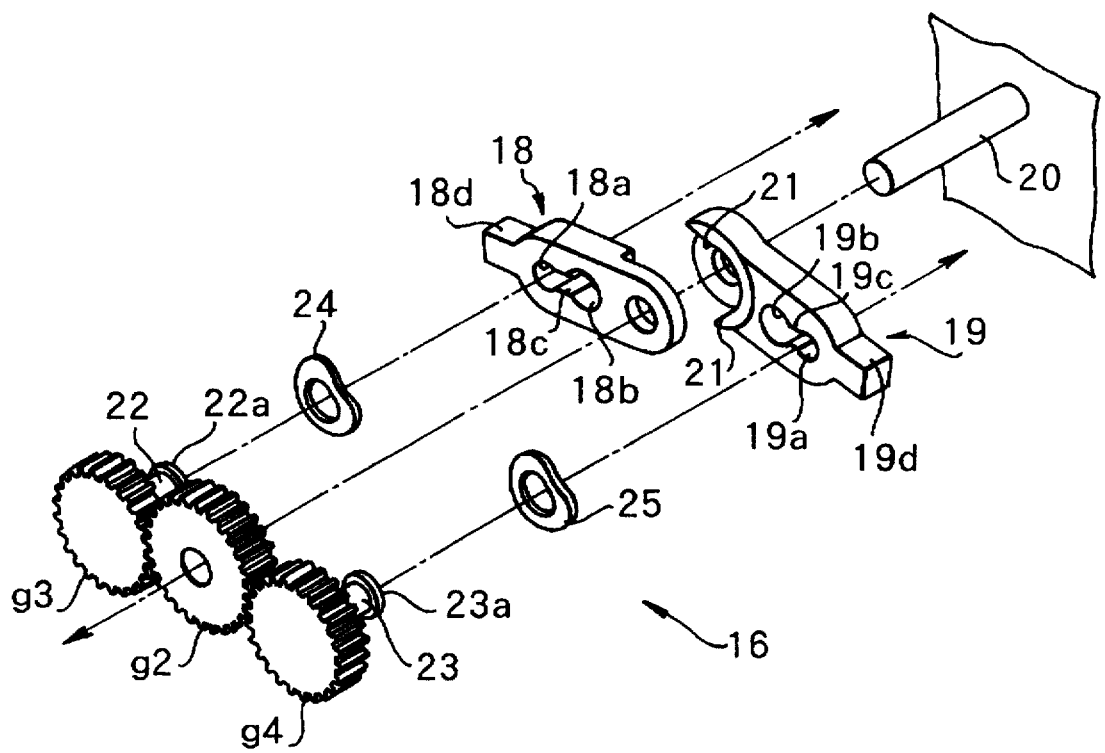
FIG. 4 is an exploded perspective view showing a structure of a first pendulum gear mechanism (sun-and-planet gear mechanism) in the gears shown in FIG. 3.
Figure 5:
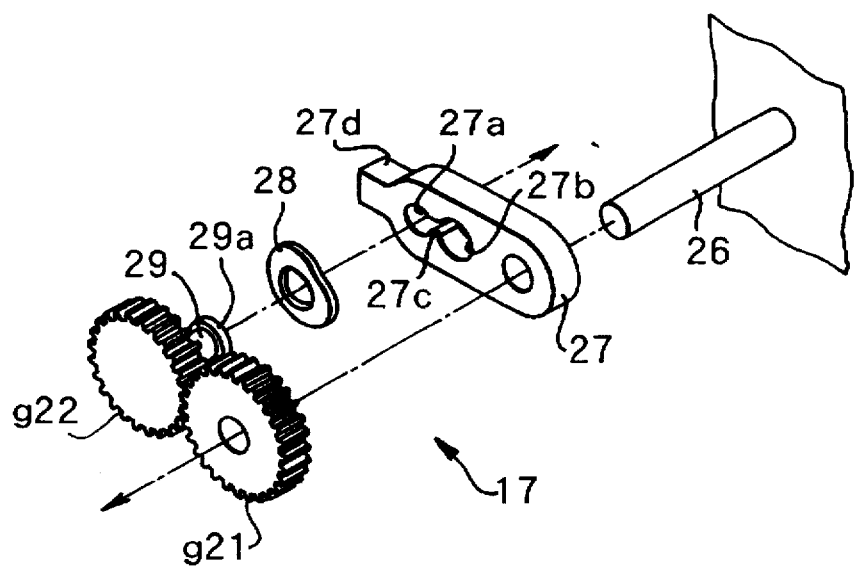
FIG. 5 is an exploded perspective view showing a structure of a second pendulum gear mechanism in the gears shown in FIG. 3.

A gear mechanism comprising the first sun gear g2 and first planet gear g3, that comprising the first sun gear g2 and second planet gear g4 and that comprising the second sun gear g21 and third planet gear g22 are respectively led "pendulum gear mechanisms". The structures of these pendulum gear mechanisms are illustrated in FIGS. 4 and 5 in exploded perspective views. Hereafter, the pendulum gear mechanism comprising the first sun gear g2, first planet gear g3 and second planet gear g4 is referred to as a first pendulum gear mechanism 16, and the pendulum gear mechanism comprising the second sun gear g21 and third planet gear g22 is referred to as a second pendulum gear mechanism 17.

A gear g5 is a gear to which rotation from the motor M is conveyed when transportation of the document P1 is being carried out. The gear g5 engages with a gear g6 and transmits the rotation from the motor M to a gear g9 via gears g6, g7 and g8. The gears g6 and g7 are formed on the same shaft and are cast as a single structure.

The gear g9 transmits the rotation from the motor M to a separation roller gear g12, which is arranged on the same shaft as the separation roller 3, via gears g10 and g11. The gear also transmits the rotation from the motor M to a feed roller gear g14, which is arranged on the same shaft as the feed roller 9, via a gear g13. The gears g9, g10 and g13 are arranged on the same shaft and are cast as a single structure.

Gears g15 and g16 are gears to which rotation from the motor M is conveyed when transportation of the recording paper P2 is being carried out. The gear g16 engages with a gear g17 and transmits the rotation from the motor M to a platen roller gear g20, which is arranged on the same shaft as the platen roller 12, via gears g17, g18 and g19. The gears g17 and are arranged on the same shaft and are formed as a single structure or a one piece element.

Gear g23 is a gear to which rotation from the motor M is conveyed when the cutter system 15 is driven. The gear g23 is positioned on the same shaft as a gear g24 and both are formed as a single structure. The gear g24 engages with a gear g25 and transmits the rotation from the motor M to a cutter system drive gear g28 via gears g25, g26 and g27.

The gears g25 and g26 are positioned on the same shaft and are formed as a single structure. The one piece structure comprising the gears g25 and g26 has the same shape as the structure comprising the gears g17 and g18 and the former structure is positioned on the same axis as the latter structure. The gears g17 and g18 and the gears g25 and g26 are independent from each other and freely rotatable on the common shaft. In FIG. 3, these gears are overlapped so that the reference numerals g17 and gear g18 are bracketed.

FIG. 4 and FIG. 5 are exploded perspective views of gear mechanisms which are used to change the transmission destination of the rotation of the motor. The first sun gear g2, a first arm member 18 and a second arm member 19 are rotatably supported on a fixed shaft 20. The second arm member 19 is in engagement with the first arm member 18. The second arm member 19 is freely rotatable relative to the first arm member 18 within the range where it is not stopped by the first arm member 18 at its abutment or stop wall 21.

The first arm member 18 has a support hole 18a and an insertion hole 18b. The support hole 18a rotatably supports a shaft 22 of the first planet gear g3 and the insertion hole 18b receives time shaft 22. Between the support hole 18a and insertion hole 18b, there is a guide hole 18c for guiding the shaft 22. The first arm member 18 also has a stopper member 18d which contacts a fixed contact portion (not shown) to prevent rotational movement of the first arm member 18 about the fixed shaft 20. Likewise, the second arm member 19 has a support hole 19a which rotatably supports a shaft 23 of the second planet gear g4, an insertion hole 19b which receives the shaft 23, a guide hole 19c which guides the shaft 23 and a stopper member 19d which contacts regulating members 40c and 40d (FIGS. 6 to 9: will be described later).

The first planet gear g3 is first inserted into the insertion hole 18b with a wave washer 24 being on the shaft 22. Then, the shaft 22 is fitted into the support hole 18a by moving it from the insertion hole 18b with guide of the guide hole 18c. At this point, a force exerted by the wave washer 24 applies a torque against the rotation of the first planet gear g3.

A stop part 22a larger in diameter than the shaft part 22 is provided near the free end of the shaft part 22. Consequently, as the wave washer 24 exerts the above mentioned force, the stop part 22a is pressed against the first arm member 18 or is forced to firmly contact the first arm member 18. Therefore, displacement or falling off of the first planet gear g3 from the support hole 18a (or the first arm member 18) is prevented.

In a similar way, the second planet gear g4 is supported by the second arm member 19 with a wave washer 25 being on the shaft 23 of the gear g4 and resiliently pressed between the gear g4 and the second arm member 19. The gear g4 is held on the second arm member 19 by the washer 25 until a force greater than a force applied by the washer 25 acts on the gear g4. The second pendulum gear mechanism 17 shown in the perspective view in FIG. 5 is similar to the first pendulum gear mechanism 16: a third arm member 27 and the second sun gear g21 are rotatably supported on a stationary shaft 26, and the third planet gear g22 with a wave washer 28 on its shaft 28 is joined with the third arm member 27 with a resilient force being exerted by the wave washer 28.

Figure 6:
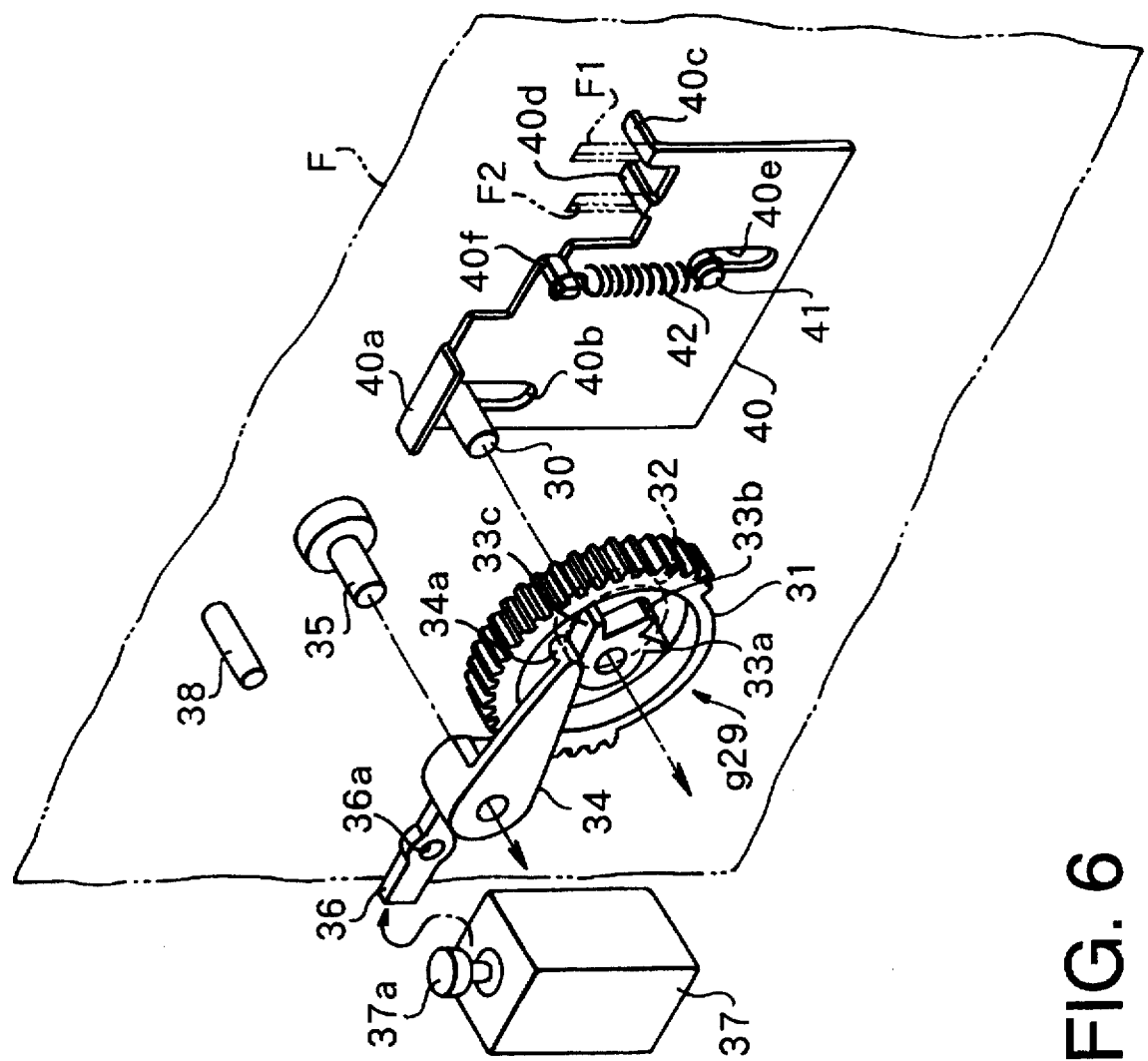
FIG. 6 is an exploded perspective view illustrating a structure of a regulating system provided to regulate movement of the first and second pendulum gear mechanisms.

FIG. 6 depicts the structure of the regulating system used for regulating the movement of the second planet gear g4 shown in FIG. 4. The regulating system is attached onto the rear of a frame F on which affixed are the gears shown in FIG. 3. With the shaft 30 attached to the frame F as a center of rotation, the gear g29 having a cut away part 31 meshes with the motor gear g1. There are no teeth in the cut away part 31. A plane cam 32 is cast as a complete structure on the gear g29 and this plane cam 32 also has the shaft 30 as its center of rotation. The cam 32 has a smaller diameter part and a larger diameter part, both centered on the shaft 30.

Claws or rungs 33a, 33b and 33c are formed on a surface of the gear g29 opposite the surface having the plane cam 32. These rungs run around the circumference of the shaft 30 when the gear g29 is mounted on the shaft 34. One of the rungs 33a, 33b and 33c engages with a couple pin 34a formed at the free end of the ratchet 34. The ratchet 34 is supported so as to be freely rotatable on the shaft 35 positioned on the frame F. A lever 36 having a hole 36a is attached to the ratchet 34 and the free end of the lever 36 connects with a plunger 37a of a solenoid 37. A pull-spring or tension spring 39 is stretched between the hole 36a and a shaft 38 which is arranged on the frame F (see FIG. 7).

The plane cam 32 contacts or abuts a first contact part 40a of a regulating plate 40 and the shaft 30 extends through a first elongated hole 40b of the regulating plate 40. The regulating plate 40 has second and third contact parts 40c and 40d, one of which contacts a stopper member 19d of the second arm member 19. These second and third contact parts 40c and 40d are inserted into grooves F1 and F2 formed in the frame F and project from the reverse side (the side on which the previously described gear group is arranged) of the frame F. The rectangular grooves F1 and F2 are parallel with the first long hole 40b.

A second elongated hole 40e is also formed in the regulating plate 40 such that it is parallel with the first elongated hole 40b, and a shaft 41 fixed to the frame F is inserted into the second elongated hole 40e. Above the second long hole 40e, a prong 40f is east together with the regulating plate 40, and an tension spring 42 is stretched between the shaft 41 and the prong 40f.

in the regulating system shown in FIG. 6, the coupling of the engaging pin 34a with any of the rungs 33a, 33b and 33c changes the bias amount of the flat cam 32 (i.e., with which rung the pin 34a engages determines how much the flat cam 32 is displaced), and the regulating plate 40 assumes one of three stepwise positions determined by these three rungs 83a–83c. Due to this, both the second and third connecting parts 40c and 40d can also assume three positions. Below, the position of the second and third connecting parts 40c and 40d when the runs 33a couples with the coupling pin 34a is called the upper position, the position of the second and third connecting parts 40c and 40d when the rung 33b couples with the coupling pin 34a is called the middle position, and the position of the second and third connecting parts 40c and 40d when the rung 33c couples with the coupling pin 34a is called the lower position.

Also on the regulating system as shown in FIG. 6, the movement of the second and third connecting parts 40c and 40d from the upper position to the middle position or from the middle position to the lower position is carried out by a crank movement (coupling/uncoupling or engagement/ disengagement) between the coupling pin 34a and the rungs 33a, 33b and 33c caused upon the turning on and of f of the solenoid 37. Specifically, the coupling pin 34a in the upper position is forced to separate from the runs 33a upon the switching on of the solenoid 37 and the first contact part 40a is pressed against the large diameter part of the cam surface 32 by the action of the pull-spring 42. As a result, the gear g29 rotates. Consequently, the coupling pin 34a couples with the rung 33b and then drops the regulating plate 40 to the middle position. Due to the next turning on of the solenoid 37, the coupling pin 34a disengages from the rung 33b and the gear g29 rotates so that the coupling pin 34a now couples with the next rung 33c and the regulating plate 40 drops to the lower position. The movement from the lower position to the upper position is carried out by the rotational movement of the motor gear g1 which engages with the gear g29. It should be noted that when the image processor 1 is in a stand-by state, the second and third connecting parts 40c and 40d are maintained in the middle position.

Figure 10:
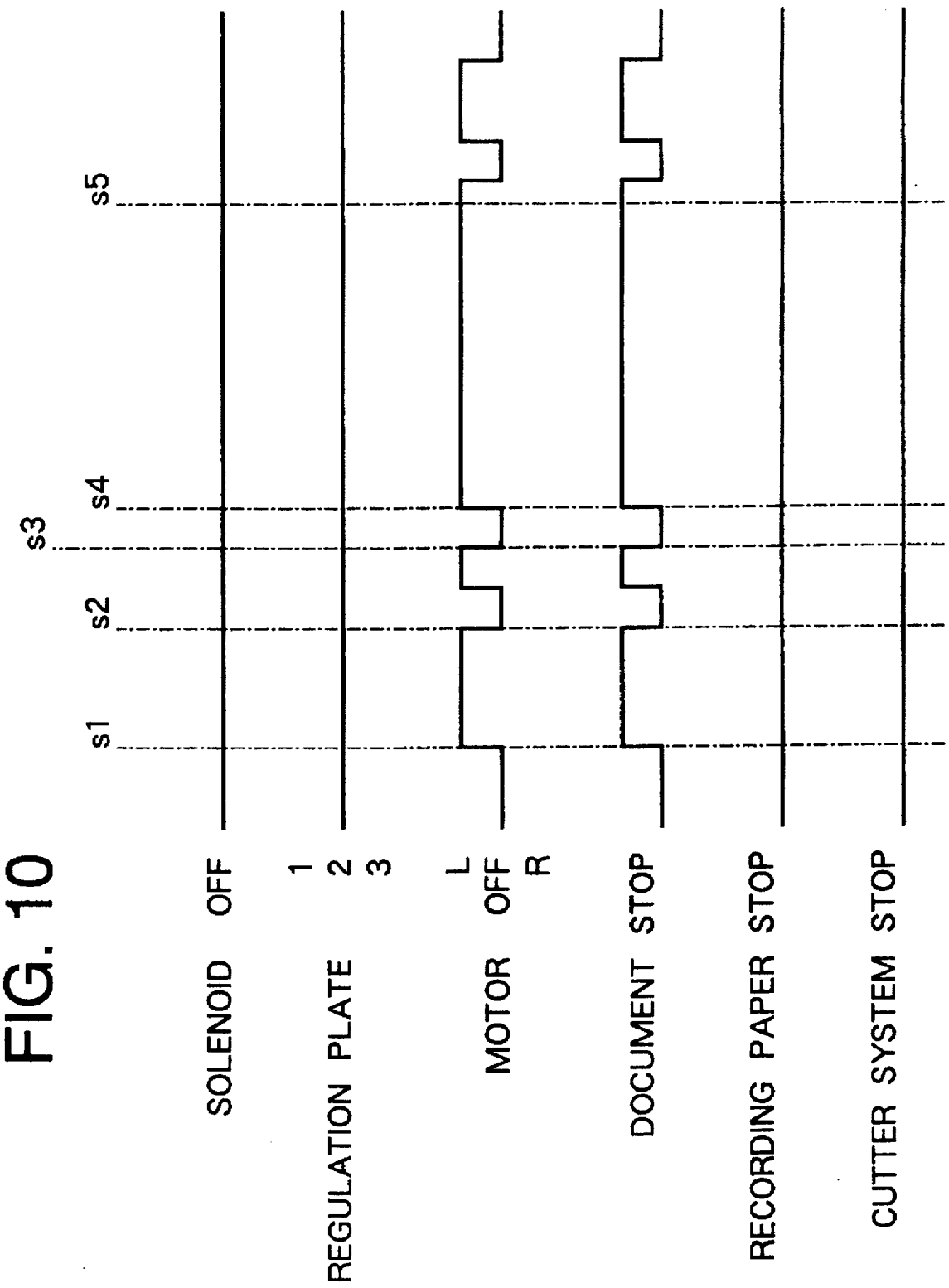
FIG. 10 is a timing chart illustrating operations of various elements of the image processor when a document is transmitted.

When transport of a document by the pendulum gear mechanism and regulating system is carried out, the following operations are performed. FIG. 10 is a time chart showing the operations of each part of the image processor 1 during the transportation of a document. In this timing chart, a clockwise rotation of the motor M is indicated as "R" denoting a rightwards rotation and a counterclockwise rotation is indicated as "L" denoting a leftwards rotation. The upper, middle and lower positions of the regulating plate 40 are indicated as "1", "2" and "3" respectively.

When the document P1 is inserted to the document feed opening 1a of the image processor 1 (FIG. 1) and the first document detection sensor S1 detects the document P1 (s1 in FIG. 10), a "document detected" signal is transmitted to the CPU 50 from the first document detection sensor S1. Upon receiving the signal from the first document detection sensor S1, the CPU 50 outputs to the motor driver 51 a signal for transportation of the document P1.

When the motor driver 51 receives the "transmit document" signal, the excitation pattern of each phase of the motor M is changed and the motor M rotates accordingly. Due to the rotation of the motor M, the motor gear g1 arranged on the rotating shaft of the motor M rotates in the counterclockwise direction in FIG. 7 as indicated by the solid line arrow. Due to the rotation of the motor gear g1, the first sun gear g2 which engages with the motor gear g1, the first arm member 18 and the second arm member 19 all, start rotating in the clockwise direction in FIG. 7.

Figure 7:
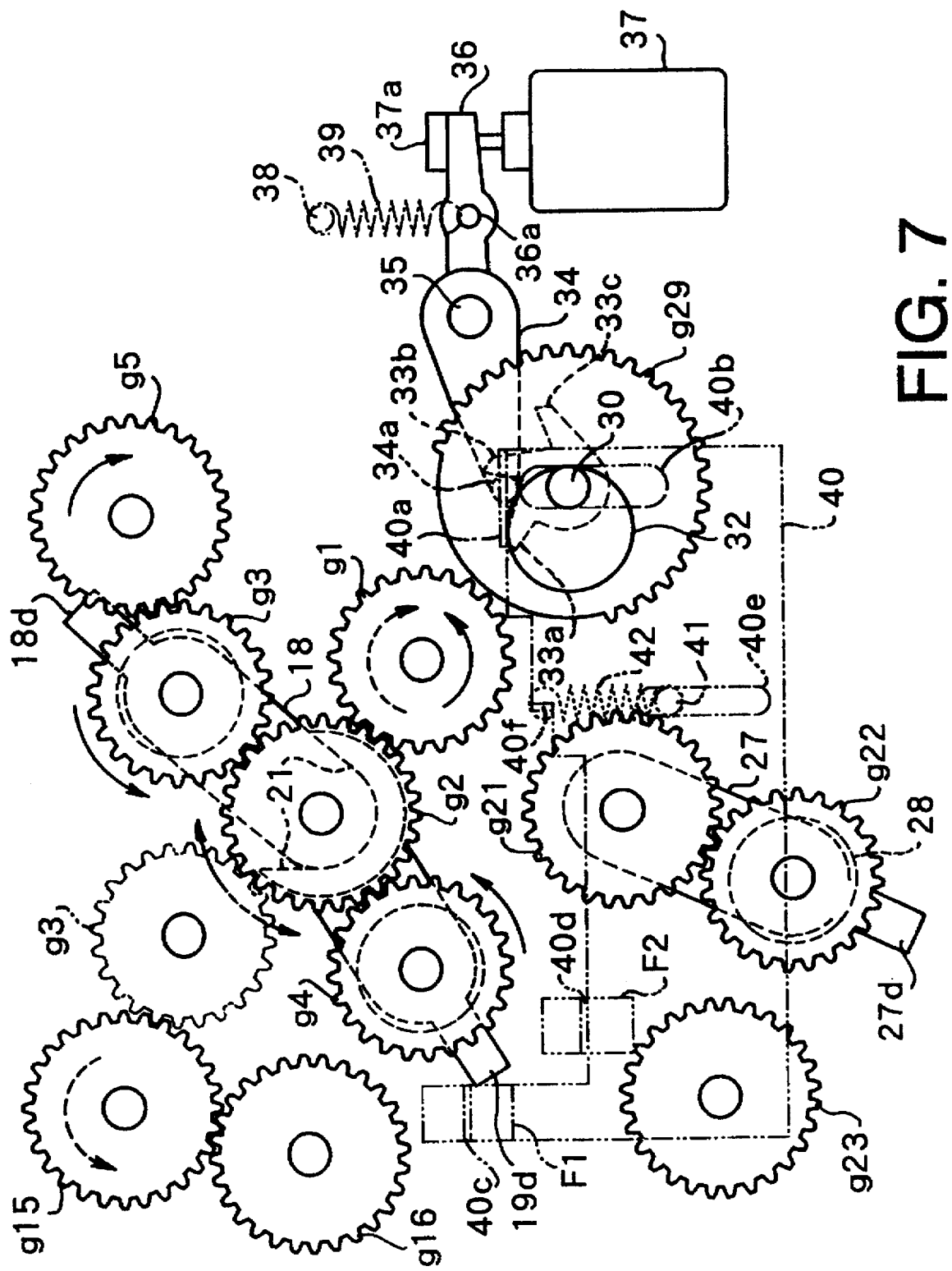
FIG. 7 shows engaging relationships between gears in the pendulum gear mechanisms when the document is transported.

When the first arm member 18 rotates in the clockwise direction in FIG. 7, the first planet gear g3 meshes with the gear g5 and the stopper member 18d arranged on the first arm member 18 contacts the fixed abutment member (not shown), then the rotation in the counterclockwise direction in FIG. 7 of the first arm member 18 is regulated or stopped. In this state, if the first sun gear g2 tries to rotate further in the clockwise direction in FIG. 7, a rotational torque higher than the load torque from time wave washer 24 is applied on the first planet gear g3. As a result, the first planet gear g3 starts rotating in the counterclockwise direction in FIG. 7 and transmits rotation of the motor gear g1 to the gear Referring again to FIG. 3, the gear g5 is adapted to transmit rotation to the separation roller gear g12 via the gears g6–g9. The gear g12 is arranged on the same shaft as the separation roller 3. The gear g5 also transmits rotation via the gears g6–g11 and g13 to the feed roller gear g14 arranged on the same shaft as the feed roller 9. Because of this, the rotation of the motor M is transmitted to the separation roller gear g12 and the feed roller gear g14 via the gear g5 so that the separation roller 8 and feed roller 9 rotate to send the document P1 toward the scanner 5.

Referring to FIG. 7, the second arm member 19 which supports the second planet gear g4 also rotates in the clockwise direction in FIG. 7 as the first sun gear g2 rotates in the clockwise direction in FIG. 7 due to a similar action as described above. When the stopper member 19d arranged on the second arm member 19 contacts the second regulating member 40c of the regulating plate 40 which is in the middle position, the rotational movement of the second arm member 19 is regulated or stopped. Then, due to the similar actions as described previously, the second planet gear g4 starts rotating in a state where it is not meshed with any gears other than the first sun gear g2.

When the front or leading edge of the document P1 forwarded by the separation roller 3 is detected by the second document detection sensor S2 (s2 in FIG. 10), the second document detection sensor S2 sends an "leading edge detected" signal to the CPU 50. When the CPU 50 receives such a signal from the second document detection sensor S2, it stops transmission of signals to the motor driver 51. The motor M stops rotating upon interruption of signals to the motor driver 51. Stopping of the rotation of this motor M results in stoppage of the rotation of the separation roller 3 and the feed roller 9. In the meantime, the CPU 50 sends a signal to the scanner 5 eliciting a state in which the scanner 5 can scan.

After the scanner 5 has entered this scan-possible state, if an operator manipulates a key unit 2 for transmission of the document P1 (image data transmission to a third party), the CPU 50 sends a signal to the motor driver 51 for transportation of the document P1 by a predetermined (specified) distance. When the motor driver 51 receives such a signal, the motor M rotates counterclockwise in FIG. 7 until the front edge of the document P1 reaches a document scanning position A (FIG. 1). After the document P1 reaches the position A, the motor M stops (s3 of FIG. 10). As described above, due to the rotation of this motor M, the separation roller 3 and feed roller 9 also rotate, and due to stoppage of the rotation of the motor M, the rotation of the separation roller 3 and feed roller 9 also stops.

Following that, the CPU 50 sends a "start scanning" signal to the scanner 5 and a "transport document" signal to the motor driver 51 (s4 of FIG. 10) respectively. When the motor driver 51 receives this signal, the motor M rotates counterclockwise in FIG. 7 in a similar manner as described above. Due to this rotation of the motor M, the separation roller 3 and feed roller 9 in combination carry out transportation of the document P1 and the surface of the document P1 (image data on the document P1) is continuously scanned at the document scanning position A.

After scanning, the reading unit or scanner 5 transmits the image data on the document's surface to the CPU 50. The CPU 50 encodes the transmitted image data and temporarily stores it in the RAM 52. After that, the CPU 50 reads out the encoded data from the RAM 52 and transmits it to the modem 54. The modem 54 modulates the encoded data and transmits it to the telephone line.

When the second document detection sensor S2 detects the rear edge of the document P1 which is continuously moved by the separation roller 3 and feed roller 9, it outputs a "rear edge detected" signal to the CPU 50 (s5 of FIG. 10). When a certain period passes after the CPU 50 receives the rear edge detection signal, the CPU 50 causes the motor M to stop. Specifically, the motor M is deactivated when the rear edge of the document P1 reaches the scanning position A.

After the motor M has stopped, the CPU 50 transmits a "finish scanning" signal to the scanner 5 to stop the scanning of the document P1. Following that, the CPU 50 transmits an "eject document" signal to the motor driver 51. When the motor driver 51 receives this signal, the motor M rotates a predetermined amount in a similar manner as described above and the document P1 whose surface has been scanned is ejected from the document discharge opening 1b. In the case where a plurality of documents P1 has been inserted from the document feed opening 1a, a detection signal is successively output to the CPU 50 from the first document detection sensor S1. Then, scanning and transportation of the documents are carried out in the manner as described above.

When image data is transmitted to the image processor 1 from outside, the recording of received image data on the recording paper P2 and cutting of the recording paper P2 after the recording are executed as will be described below.

Figure 11:
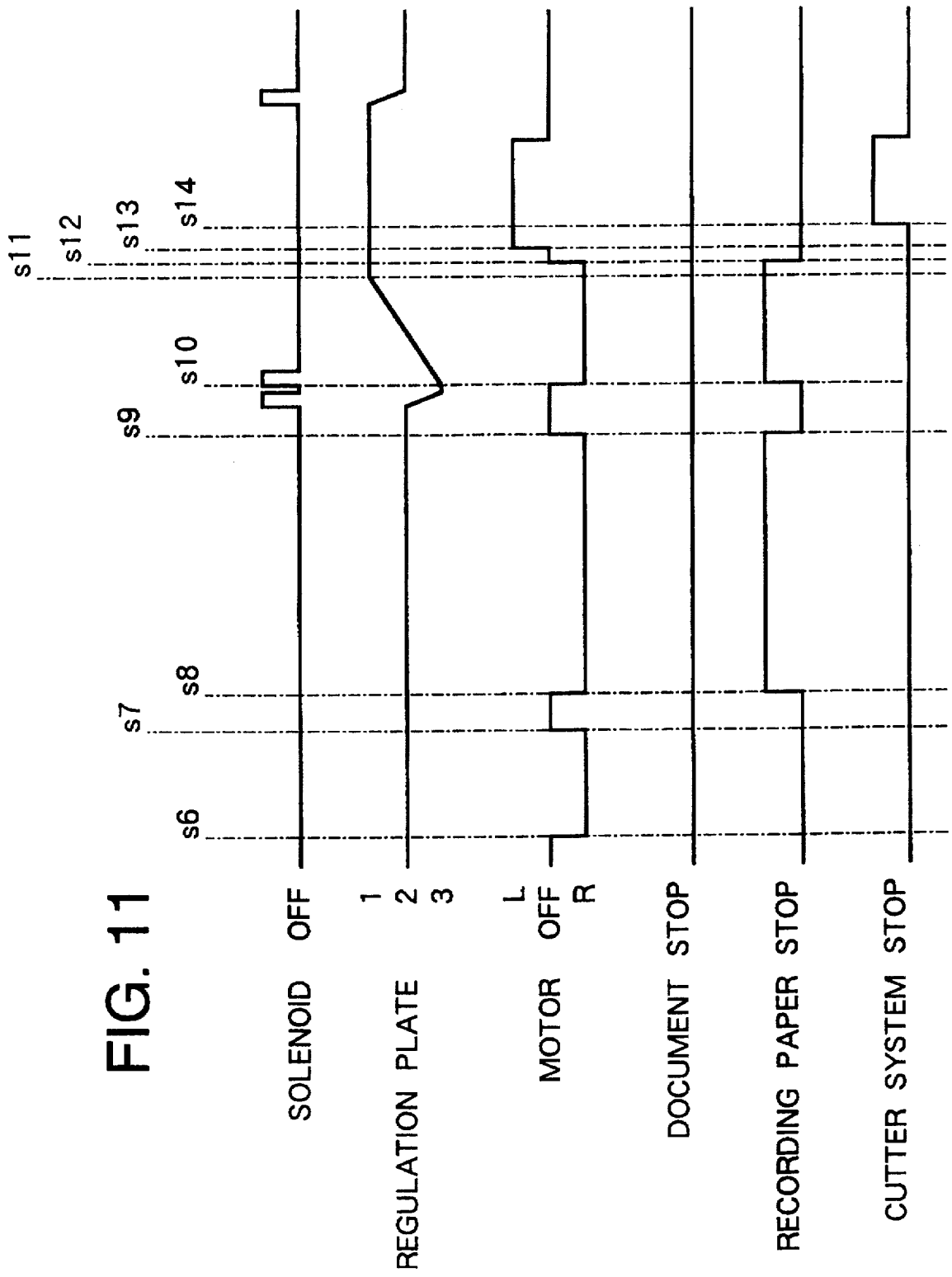
FIG. 11 is a time chart illustrating operations of the elements of the image processor when recording is carried out on the recording paper and then the recording paper is cut.

Referring to FIG. 11, illustrated is a timing chart of operations of each part of the image processor 1 when the recording paper is transported. A signal is sent from the CPU 50 to the recording unit 13 such that the recorder 13 enters a recording-possible state (recording stand-by state). Then, the CPU 50 sends a particular signal to the motor driver 51. When the motor driver 51 receives this signal, it rotates by a predetermined amount in the clockwise direction in FIG. 7 in a similar manner as described above (s6 in FIG. 11).

Due to this rotation of the motor M by a predetermined amount in the clockwise direction in FIG. 7, the motor gear g1 also rotates in the clockwise direction in FIG. 7 and the first sun gear g2 rotates in the counterclockwise direction in FIG. 7. Then, the first planet gear g3 moves by actions as described above from a position where it engages with the gear g5 to a position where it engages with the gear g15 (s7 of FIG. 11). After that, the second planet gear g4 moves to a position where it meshes with the second sun gear g21. Then, the NCU 55 causes the modem 54, which is connected to the telephone line, to demodulate the encoded data transmitted from a third party and sends it to the CPU 50. The CPU 50 causes the RAM 52 to temporarily store this demodulated encoded data.

After the CPU 50 decodes one line's worth of encoded data stored in the RAM 52, not only is this decoded image data sent to the recorder 13 but a signal instructing transportation of the recording paper P2 is also sent to the motor driver 51. When the motor driver 51 receives this signal, the motor M rotates in the clockwise direction in FIG. 7 due to similar actions as described above (s8 of FIG. 11). Owing to the rotation of the motor M, the motor gear g1 also rotates in the clockwise direction in FIG. 7 whereas the first sun gear g2 rotates in the counterclockwise direction in FIG. 7. Then, the first planet gear g3 starts relating in the clockwise direction in FIG. 7 in a similar manner as described above so that the rotation of the motor M is transmitted to the gear g15.

The gear g15 is able to transmit rotation to the platen roller gear g20, which is arranged on the same axis as the platen roller 12, via the gears g16–g19. Therefore, the rotation of the motor M in the clockwise direction in FIG. 7 causes the platen roller 12 to rotate and feed the recording paper P2 in the sending direction. Eventually the recording paper P2 is sent or unrolled to the recording position B and recording of the received image data is carried out.

When the recording of one page has finished, the CPU 50 sends a "finish recording" signal to the recorder 13 and stops sending a signal for transportation of the recording paper P2 to the motor driver 51. Then, the rotation of the motor M stops through similar actions as described above. Upon the stopping of the rotation of the motor M, transportation of the recording paper P2 is also interrupted (s9 of FIG. 11).

in this state, the CPU 50 sends an activation or excitation signal to the solenoid 37. The plunger 37a is sucked into the solenoid 37 due to this signal. This causes the ratchet 34 to rotate about the shaft 35 in the clockwise direction in FIG. 7 so that the pin 34a disengages from the rung 33b. In association with this disengagement, the first contact part 40a makes the cam 32 rotate in the counterclockwise direction in FIG. 7 due to the action of the spring 42 (i.e., the gear g29 is forced to rotate in the counterclockwise direction). Then the contact part 40a goes to the smaller diameter part of the cam 32 and the regulation plate 40 drops. At this point, the CPU 50 sends a deactivation signal to the solenoid 37. Accordingly, the spring 39 pulls back the plunger 37a so that the coupling pin 34a which has separated from the rung 33b now engages with the rung 33c. Then, the second and third contact parts 40c and 40d of the regulation plate 40 are maintained in the lower position (FIG. 9).

Next, the CPU 50 sends another excitation signal to the solenoid 37 at the same time as sending a signal to the motor driver 51 instructing transportation of the recording paper P2 by a predetermined amount. In this case, the predetermined amount is the distance from the recording position B to the cutting position C. Thus, the plunger 37a is again pulled into the solenoid 37. Then, in a similar manner as described above, the coupling pin 34a disengages from the rung 33c and the gear g29 engages with the motor gear g1 (FIG. 9). In this state, the CPU 50 once again sends a deactivation signal to the solenoid 37 so that the plunger 37a is brought into a pulled back state as described above. On the other hand, when the motor driver 51 receives a signal from the CPU 50, the motor M rotates in the clockwise direction in FIG. 9 by similar actions as described above. This rotation of the motor M also causes the motor gear g1 to rotate in the clockwise direction in FIG. 9 whereas it causes the gear g29 to rotate in the counterclockwise direction in FIG. 9 (s10 of FIG. 11).

Figure 8:
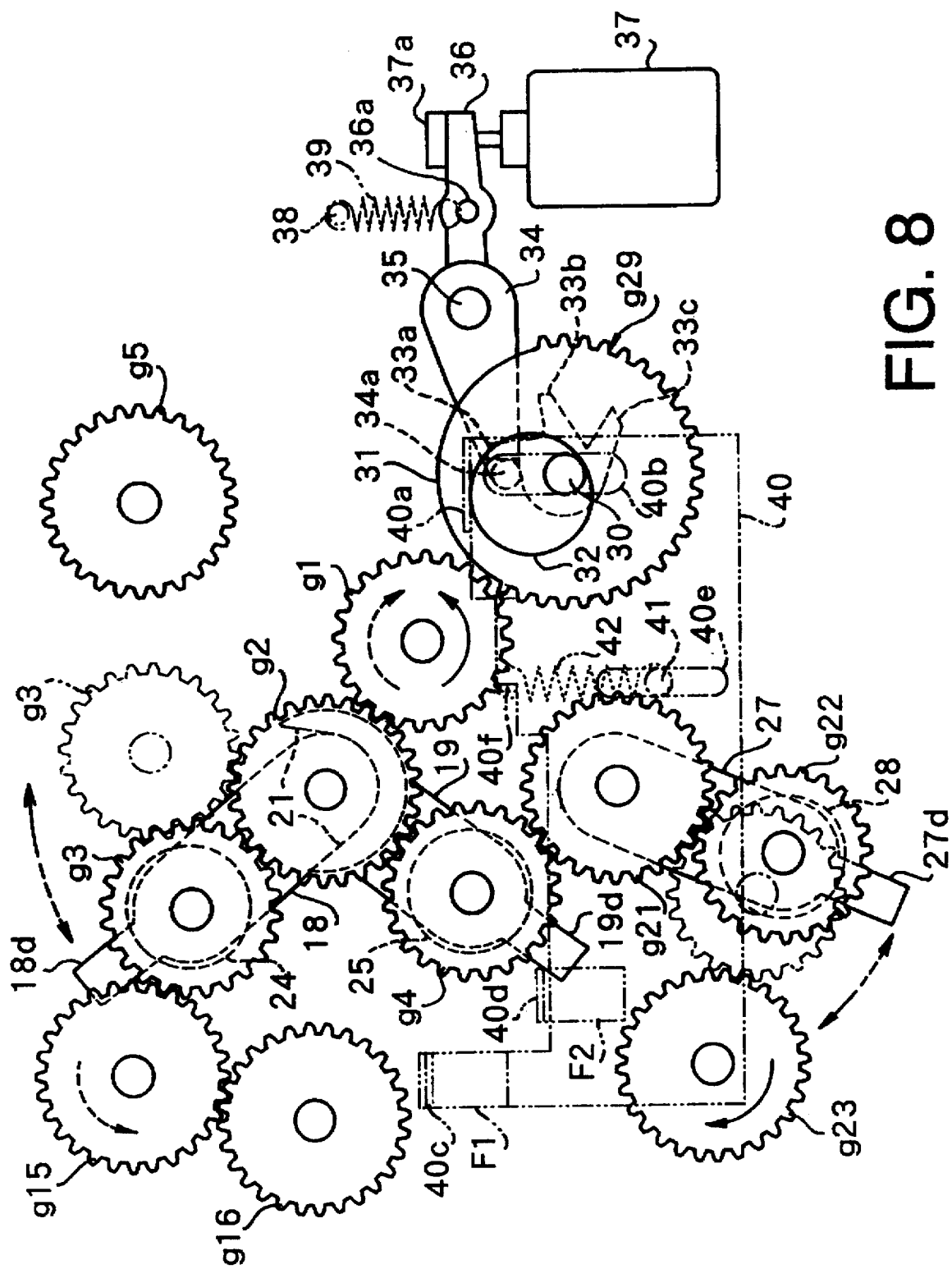
FIG. 8 shows engaging relationships between gears in the pendulum gear mechanisms when the recording paper is transported by its transport system and cut by a cutter system.
Figure 9:
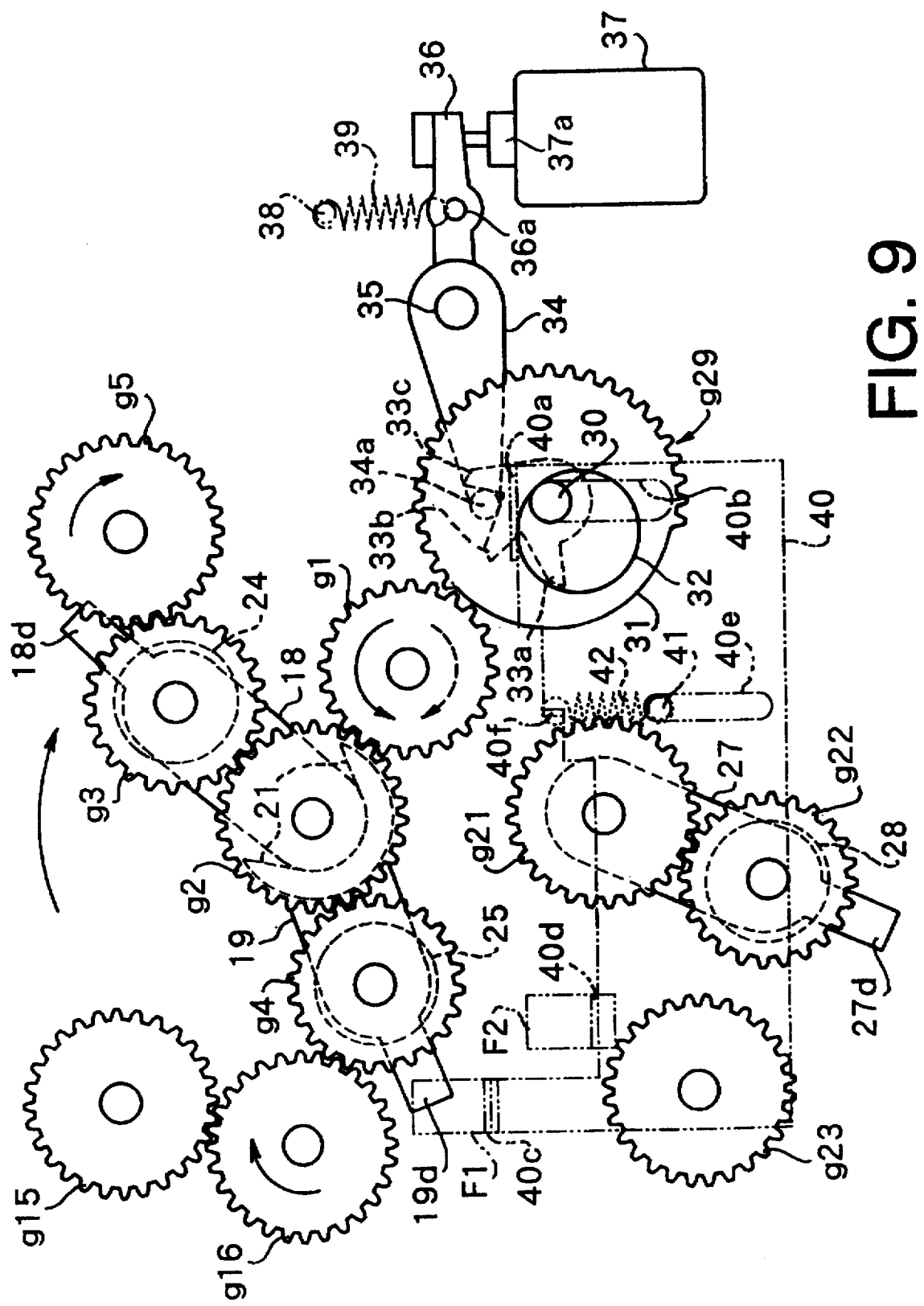
FIG. 9 depicts relations between gears in the pendulum gear mechanisms when the document and recording paper are simultaneously transported for copying.

Upon the rotation of the gear g29 in the counterclockwise direction in FIG. 9, the contact of the gear g29 with the contact part 40a of the cam 32 is shifted to its larger diameter part from its smaller diameter part. As a result, the regulating plate 40 is pushed up and the second and third contact parts 40c and 40d move from the lower position to the upper position (s11 of FIG. 11). When the second and third contact parts 40c and 40d have moved to the upper position, the gear g29 is disengaged from the motor gear g1 and the coupling pin 34a engages with the rung 33a (see FIG. 8). It should be noted that the above-mentioned rotation of the gear g29 is completed by the time the transport of the recording paper P2 by the rotation of the motor M has finished (s12 of FIG. 11).

When the rotation of the motor M is stopped and a rear-edge-to-be-part of the recording paper P2 has been transported to the cutting position C, the CPU 50 sends a signal to the motor driver 51 instructing driving of the cutter system 15. As the motor driver 51 receives such a signal, the motor M rotates in the counterclockwise direction in FIG. 7 by similar actions as described above (s13 of FIG. 11). Due to this rotation of the motor M, the motor gear g1 also rotates in the counterclockwise direction in FIG. 7 so that the first sun gear g2 rotates in the clockwise direction in FIG. 7.

Owing to the rotation of the sun gear g2, the second arm member 19 attempts to rotate in the clockwise direction in FIG. 8. However, since the stopper member 19d of the second arm member 19 contacts the third contact part 40d, the rotational movement of the second arm member 19 is prevented. Because of this, the second planet gear g4 starts rotating in the counterclockwise direction in FIG. 8 by similar actions as described above. Consequently, the rotation of the motor M is transmitted to the second sun gear g21 via the motor gear g1, the first sun gear g2 and the second planet gear g4, and the second sun gear g21 rotates in the clockwise direction in FIG. 8.

When the second sun gear g21 rotates, the third arm member 27 supporting the third planet gear g22 carries out a rotational movement in the clockwise direction in FIG. 8 by a similar action as described above. Then, the third planet gear g22 engages with the gear g23 and the stopper member 27d of the third arm member 27 contacts a stopper (not shown). Thus, the third planet gear g22 starts rotating in the counterclockwise direction in FIG. 8 by a similar action as described above.

Accordingly, the rotation from the motor gear g1 is transmitted to the gear g23 and the rotation of the gear g23 is transmitted to the cutter drive gear g28 thereby driving the cutter system 15 via the gears g24–g27. This rotation of the cutter drive gear g28 actuates the cutter system 15 thereby initiating the cutting of the recording paper P2 (s14 of FIG. 11). The cut recording paper P2 is ejected from the recording paper ejection opening 1c. After ejection of the recording paper P2, the motor M further rotates in the counterclockwise direction in FIG. 8 till the cutter system 15 is pulled back to its original position. After the motor M has stopped, the CPU 50 turns the solenoid 37 on and off once such that the second and third contact parts 40c and 40d are maintained in the middle position.

While the cutter system 15 is operating, the first arm member 18 rotates in the clockwise direction in FIG. 8 due to the rotation of the motor gear g1 in the counterclockwise direction in FIG. 8. Then, when the first arm member 18 abuts the contact part 21 of the second arm member 19, the rotation of the first arm member 18 is prohibited and the first planet gear g3 starts rotating in the state where it engages with no gears other than the first sun gear g2.

Figure 12:
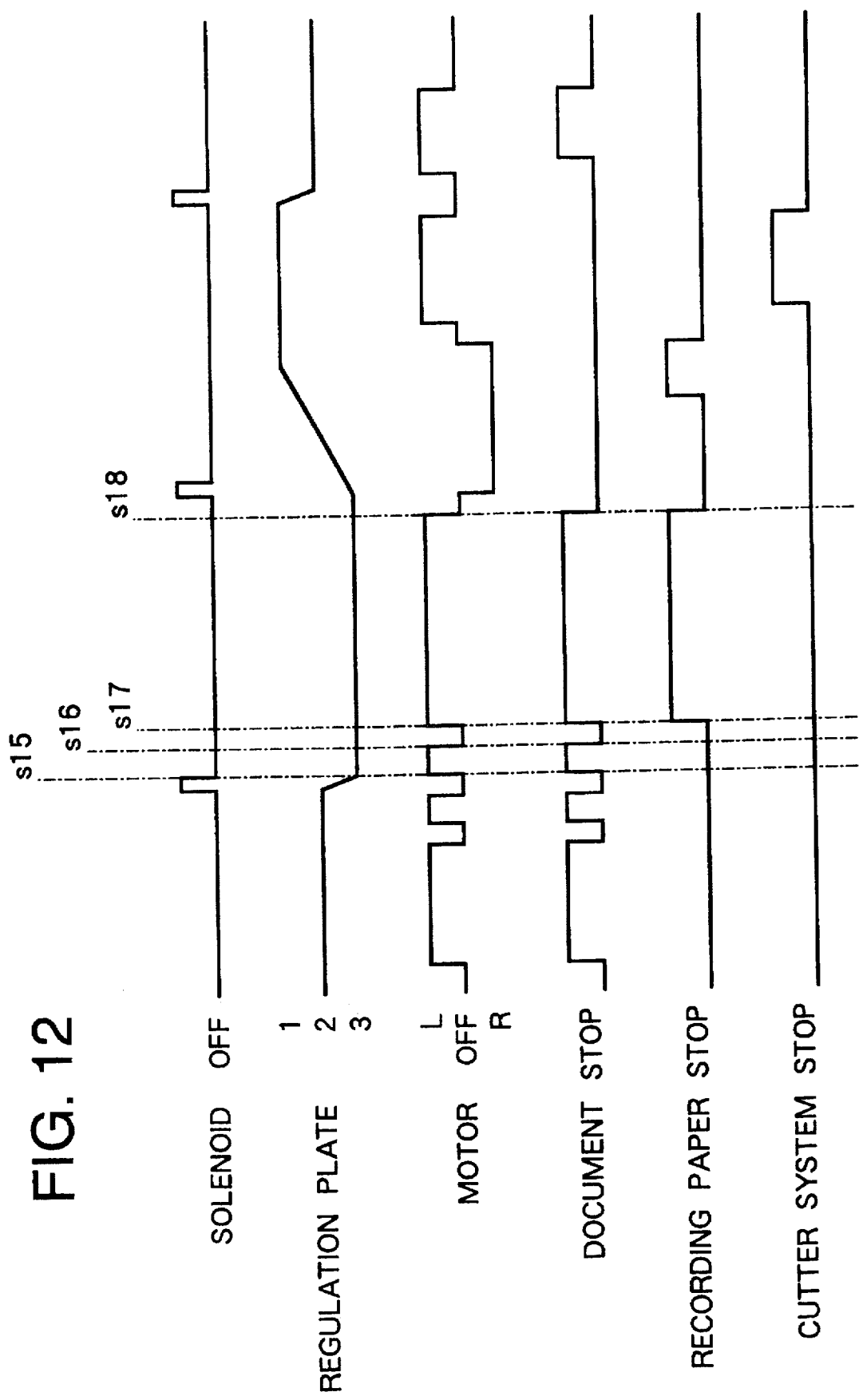
FIG. 12 is a time chart illustrating operations of the elements of the image processor when the document is copied and then the recording paper is cut.

In a case where copying of the document P1 onto the recording paper P2 and cutting of the recording paper P2 are to be executed, the following operations will take place. FIG. 12 illustrates a timing chart of operations of each part of the image processor 1 when copying a document P1. It should be noted that actions of the leading edge of the document P1 being transported to the position of the second document detection sensor S2 and actions thereafter until the scanner's entering a scan-possible state are the same as those as described above for transportation of the document P1. After the scanner 5 has entered the scanning heady state, the operator manipulates the key unit 2a to instruct a document copy operation.

The CPU 50 outputs a signal to the motor driver 51 instructing transportation of the document P1 by a predetermined amount. When the motor driver 51 receives this signal, the motor M rotates in the counterclockwise direction in FIG. 7 such that the leading edge of the document P1 is transported to between the second document detection sensor S2 and the document scanning position A. After this transportation of the document P1, the motor M stops. Due to this rotation of the motor M, the separation roller 3 and feed roller 9 rotate in a similar manner as described above. Upon the stopping of the rotation of the motor M, the separation roller 3 and feed roller 9 also stop rotating as described above.

After the stoppage of the motor M, the CPU 50 sends a signal to the solenoid 37 to cause the plunger 37a to be pulled into the solenoid 37. Due to this, the ratchet 34 rotates about the shaft 35 in the clockwise direction in FIG. 7 so that the coupling pin 34a is disengaged from the rung 33b. After that, the CPU 50 switches the solenoid 37 to an off state so that the coupling pin 34a which had separated from the rung 33b now couples with the next rung 33c. In this case, the second and third contact parts 40c and 40d of the regulating plate 40 are maintained in the lower position (s15 of FIG. 12).

When the second and third contact parts 40c and 40d of the regulating plate 40 are maintained in the lower position, the CPU 50 sends a signal to the motor driver 51 for transportation of the document P1 by a predetermined amount. When the motor driver 51 receives this signal, the motor M rotates in the counterclockwise direction in FIG. 9 by similar actions as described above until the leading edge of the document P1 reaches the document scanning position A. The motor M then stops it should be noted that the aforementioned predetermined amount is the distance from the leading edge of the document P1 positioned between the second document detection sensor S2 and the document scanning position A to the document scanning position A. It should also be noted that the position between the second document detection sensor S2 and the document scanning position A is the position which satisfies a condition that the leading edge of the document P1 rotated by the first planet gear g3 will be just transported to the document scanning position A when the motor M rotates till the second planet gear g4 and the gear g16 engage with each other.

At this point, the first planet gear g3 starts rotating in the same way as the case of transportation of the document P1, and transmits the rotational power of the motor M to the separation roller 3 and the feed roller 9. On the other hand, when the second and third contact parts 40c and 40d are held in the lower position, the contact between the second contact part 40c and the stopper member 19d which has been preventing the rotation of the second arm member 19 is no longer maintained. As a result, the rotation of the motor M causes the second arm member 19 to rotate clockwise in FIG. 9 until the second planet gear g4 engages with the gear g16. Following that, due to the stopping of the rotation of motor M, the second arm member 19 stops its rotating movement and the second planet gear g4 is maintained engaged with the gear g16.

In the above described state, the CPU 50 sends a signal to the motor driver 53 instructing transportation of the document P1 and recording paper P2. Furthermore, the CPU 50 sends a "start scanning" signal to the scanner 5 and a "start recording" signal to the recorder 13 respectively. Upon receiving the signal, the motor driver 51 causes the motor M and the motor gear g1 to rotate counterclockwise in FIG. 9. Due to this, the first planet gear g3 transmits the rotation of the motor M to the gear g5 and the second planet gear g4 transmits the rotation of the motor M to the gear g16. Therefore, the document P1 is advanced by the separation roller 3 and the feed roller 9 and the recording paper P2 is forwarded by the platen roller 12 (s17 of FIG. 12 ).

Upon receiving the signal from the CPU 50, the scanner 5 continuously scans the surface (image data) of the document P1 being transported by the feed roller 9. Then, the scanner 5 sends the scanned image data to the CPU 50. The CPU 50 in turn sends the image data to the recorder 13. The recorder 13 then carries out a recording on the recording paper P2 based on the sent image data.

After the above described copy operation, the second document detection sensor S2 detects the rear edge of the document P1. Then, the motor M forces the document P1 to proceed until the rear edge of the document P1 reaches the document scanning position A as in the case of transmission of the document P1. The motor M stops thereafter (s18 of FIG. 12). Upon the stopping of the motor M, the transport of the recording paper P2 also stops. The CPU 50 then sends a "stop scanning" signal to the scanner 5 and a "stop recording" signal to the recorder 13 to complete the first page of copying.

The cutting of the recording paper P2 after copying of one page of the document P1 is conducted in a similar manner as the cutting operation for the recording paper P2 after recording of the received image data (see FIG. 11.). After cutting, if a detection signal is output from the first document detection sensor S1 to the CPU 50, the CPU 50 believes that there is another document and repeats the above described operations once again. If a detection signal is no longer directed to the CPU 50, the document P1 ejection operation is carried out in a similar manner as the transportation of the document P1.

In the case of the image processor of the present embodiment, when exchange of the roll of recording paper P2 is needed or when power supply is resumed after power failure etc, it is necessary to set the leading-edge-to-be-portion of the recording paper P2 in the standby position and to cut off any excess portion of the recording paper P2 (below, this operation is referred to as a (normal) initial cutting). Generally, the initial cutting is carried out in the following order (see FIG. 13). A signal is output from the CPU 50 to the solenoid 37 and the solenoid 37 which has received this signal carries out the plunger 37a sucking operation twice. As a result, the second and third contact parts 40c and 40d move once to the lower position (see FIG. 9).

In the state where the second and third contact parts 40c and 40d are maintained in the lower position, the CPU 50 feeds a signal to the solenoid 37 and feeds a motor drive signal to the motor driver 51 respectively. Then, by the same operations as described above, the second and third contact parts 40c and 40d move from the lower position to the upper position (see FIG. 8 and s19 of FIG 13). At this point, the motor M and the motor gear g1 rotate clockwise respectively in FIG. 8 and the rotation of the motor M is transmitted to the first planet gear g3 via the first sun gear g2. Due to this, the platen roller 12 transports the recording paper P2 toward the cutter system 15. Afterwards, the motor M forces the recording paper P2 to advance by a predetermined amount before deactivated (s20 of FIG. 13).

After the motor M has stopped rotating, the CPU 50 outputs a signal to the motor driver 51 instructing driving of the motor M in the counterclockwise direction in FIG. 8. When the motor driver 51 receives this signal, the motor M rotates in the counterclockwise direction in FIG. 8 (s21 of FIG. 13). Due to this rotation of the motor M, the motor gear g1 also rotates in the counterclockwise direction in FIG. 8 so that the first sun gear g2 rotates in the clockwise direction in FIG. 8. The rotation of the first sun gear g2 is transmitted to the cutter system in a similar way as in the case of cutting the recording paper P2 by the cutter system 15 after recording.

Further, the recording paper P2 is cut by the cutter system 15 and the cut recording paper P2 is ejected from the recording paper ejection opening 1c. The motor M stops when the cutter system 15 is pulled back to its original position. This series of operations is referred to as a normal initial cutting. After the initial cutting has finished, the CPU 50 sends a signal to the solenoid 37 such that the second and third contact parts 40c and 40d are maintained in the middle position.

If detection signals are output from the first and second recording paper detection sensors S3 and S4 to the CPU 50 (which means that a roll of recording paper P2 is properly set in the image processor) and another detection sensor (not shown) which is for detecting opening/closing of the cutter system 15 detects an open state of the cutter system 15, then the above mentioned normal initial cutting is executed. Conversely, if the last detection sensor detects a closed state of the cutter system 15, then the CPU 50 sends a signal to the motor driver 51 so that the motor M rotates in the counterclockwise direction in FIGS. 7 to 9. When the motor driver 51 receives this signal, the motor M rotates counterclockwise in FIGS. 7 to 9. After a while, if the last detection sensor detects an open state of the cutter system 15, it means that the second and third contact parts 40c and 40d are maintained in the upper position (see FIG. 8) and that the normal initial cutting is now ready to start.

If the motor M rotates in the counterclockwise direction in FIGS. 7 to 9 but said detection sensor (not shown) does not detect an open state of the cutter system 15, it means that the second and third contact parts 40c and 40d are maintained in the middle position (see FIG. 7) or the lower position (see FIG. 9). In this case, the CPU 50 sends a signal to the solenoid 37 to turn on and off the solenoid 37 once. Afterwards, the CPU 50 sends a signal to the solenoid 37 and the motor driver 51 respectively. As a result, the second and third contact parts 40c and 40d are maintained for one time in the lower position (see FIG. 9). Then, due to the rotation of the motor M in the clockwise direction in FIG. 9, they move to the upper position (see FIG. 8). In this state, the CPU 50 ends the operations of the image processor 1 as an error. Afterwards, it becomes possible for the normal initial cutting to be carried out as in the way described above.

If a detection signal is not sent from the first recording paper detection sensor S3 to the CPU 50 (i.e., if there is no roll of recording paper P2 in the image processor 1), the CPU 50 sends a signal to the solenoid 37 to make the solenoid 37 turned on and off twice. Then, the CPU 50 sends a signal to the solenoid 37 and motor driver 51 respectively. As a result, the second and third contact parts 40c and 40d are maintained for one time in the lower position (see FIG. 9). Thereafter, due to the rotation of the motor M in the clockwise direction in FIG. 9, they move to the upper position (see FIG. 8).

At this point, if said detection sensor (not shown) detects an open state of the cutter system 15, the CPU 50 sends a signal to the solenoid 37 and maintains the second and third contact parts 40c and 40d in the middle position. On the other hand, if said detection sensor does not detect an open state of the cutter system 15, the CPU 50 sends a signal to the motor driver 51 and forces the motor M to rotate in the counterclockwise direction in FIG. 8 until said detection sensor detects an open state of the cutter system 15. After that, the CPU 50 outputs a signal to the solenoid 37 thereby maintaining the second and third contact parts 40c and 40d. In the middle position.

After opening and closing a cover for insertion of a roll of recording paper P2 in the image processor, if the first record paper detection sensor S3 sends a detection signal to the CPU 50 but the second recording paper detection sensor S4 does not output a detection signal to the CPU 50 and the detection sensor (not shown) detects an open state of the cutter system 15, then the CPU 50 does not transmit a signal to the solenoid 37 and judges that errors have occurred so that it interrupts the operations of the image processor 1.

Also, if the detection sensor (not shown) detects a closed state of time cutter system 15, the CPU 50 sends a signal to the motor driver 51 and makes the motor M rotate in the counterclockwise direction in FIG. 8. Furthermore, if the detection sensor (not shown) detects an open state of the cutter system 15 after the rotation of the motor M, then the CPU 50 stops the transmission of signals to the motor driver 51 to stop the rotation of the motor M. Following that, the normal initial cutting can be carried out in a manner as described above. Conversely, if the detection sensor (not shown) does not detect an open state of the cutter system 15 after the rotation of the motor M, the same kind of operations as in the case where the rolled recording paper P2 is correctly set in the image processor 1 and there is detection of a closed state of the cutter system 15 is carried out.

What is claimed is:

1. An image processor capable of transmitting and receiving a document, copying a document and cutting a recording paper by a cutter, comprising:

one drive means;

exchange means for exchanging a transmission direction of rotation of the drive means;

lock means for locking the exchange means in a predetermined position; and first control means for controlling a rotation direction of the drive means and an operation of the lock means, wherein each of the document transmitting operation, the document receiving operation, the document copying operation and the recording paper cutting operation is conducted by the one drive means, the exchange means, the lock means and the first control means.

2. The image processor as claimed in claim 1 further including a system for transporting the document, a system for transporting the recording paper and a system for driving the cutter, and wherein the exchange means includes:

a first exchange gear mechanism that transmits the rotation of the drive means, which has been controlled by the first control means, to either the document transport system or the recording paper transport system or to both of them; and a second exchange gear mechanism that receives the rotation from the drive means via the first exchange gear mechanism and then either transmits the rotation of the drive means to the cutter drive system or stops transmission of the rotation of the drive means.

3. The image processor as claimed in claim 2, wherein the lock means includes:

a regulating member that regulates movement of the first exchange gear mechanism;

a gear having a flat cam;

a ratchet mechanism; and a solenoid, and wherein the gear, the ratchet mechanism and the solenoid cooperate to move and hold the regulating member in a plurality of predetermined positions.

4. The image processor as claimed in claim 3 further including:

first detection means arranged in a transport route of the document for detecting presence of the document; and second detection means arranged in a transport route of the recording paper for detecting presence of the recording paper; and second control means for receiving outputs from the detection means to control the rotation direction of the drive means and turning on/off of the solenoid of the lock means.

* * * * *